US006738629B1

United States Patent
McCormick et al.

(10) Patent No.: US 6,738,629 B1
(45) Date of Patent: May 18, 2004

(54) METHOD FOR FLOOD PAGING IN A TELECOMMUNICATIONS NETWORK

(75) Inventors: Mark Alan McCormick, Naperville, IL (US); Richard Robert Boland, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/569,983

(22) Filed: May 10, 2000

(51) Int. Cl.$^7$ ................................................ H04Q 7/20
(52) U.S. Cl. .................... 455/456.1; 455/433; 455/440; 455/456.2
(58) Field of Search ................................. 455/422, 424, 455/432–435, 440, 445, 456, 458, 461, 422.1, 432.1–432.3, 435.1, 456.1, 456.2, 456.6

(56) References Cited

U.S. PATENT DOCUMENTS

| 5,153,902 A | * | 10/1992 | Buhl et al. ..................... 379/57 |
| 5,519,758 A | * | 5/1996 | Tabbane ........................ 379/59 |
| 5,619,552 A | * | 4/1997 | Karppanen et al. ........... 379/60 |
| 5,699,407 A | * | 12/1997 | Nguyen ........................ 379/59 |
| 5,873,042 A | * | 2/1999 | Vo ............................... 455/458 |
| 5,903,844 A | * | 5/1999 | Bruckert et al. ............. 455/456 |
| 6,023,624 A | * | 2/2000 | Hanson ........................ 455/458 |
| 6,058,308 A | * | 5/2000 | Kallin et al. ................. 455/432 |
| 6,097,963 A | * | 8/2000 | Boltz et al. .................. 455/518 |
| 6,311,060 B1 | * | 10/2001 | Evans et al. ................. 455/426 |

FOREIGN PATENT DOCUMENTS

| WO | WO 97/08912 | * | 3/1997 | ............. H04Q/7/38 |

* cited by examiner

Primary Examiner—William Trost
Assistant Examiner—Meless Zewdu

(57) ABSTRACT

Methods for locating a missing called mobile unit in a telecommunications network are disclosed. With various equipment manufacturers present in the telecommunications industry, methods for use with a variety of equipment made by those manufacturers are necessary. The equipment in the network would include mobile units, home location registers and mobile switching centers. Through alterations in the operation of the home location registers and/or the mobile switching centers, the responses to page requests and/or routing requests are varied from the typical responses. Through those variations, missing called mobile units may be located in an efficient manner, regardless of the equipment provider.

10 Claims, 5 Drawing Sheets

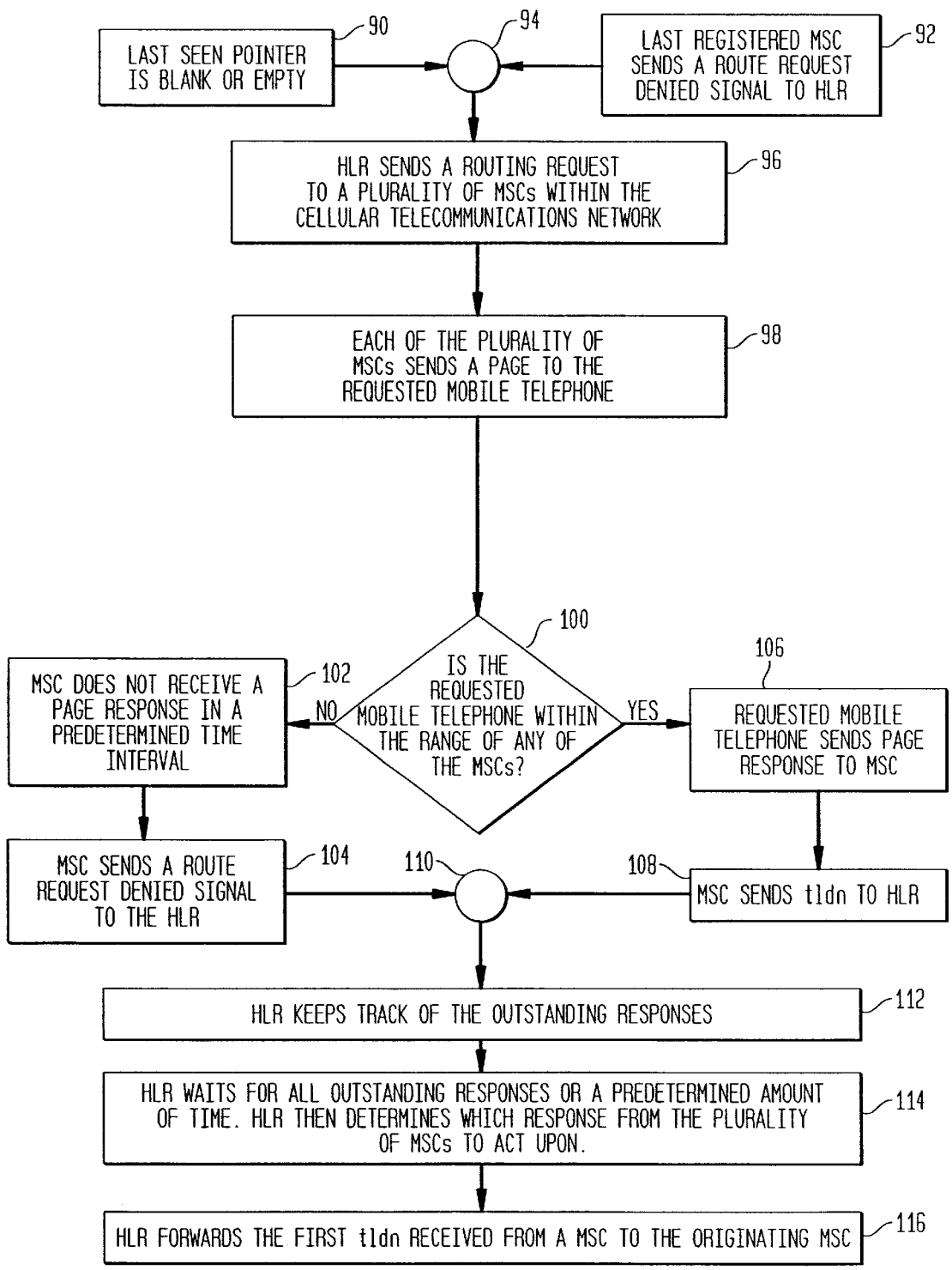

METHOD FOR FLOOD PAGING IN A TELECOMMUNICATIONS NETWORK

FIELD OF THE INVENTION

The present invention broadly relates to the field of mobile telecommunications, and specifically to "flood paging" where multiple mobile switching centers (MSCs) are paged to locate a mobile unit that is not where it was last known to be, i.e. not where its last seen pointer (LSP) indicates.

BACKGROUND OF THE INVENTION

Telephones have become a staple of modern life. Originally telephones were located in peoples' homes, businesses and in external phone booths. Thanks to changes in the field of telecommunications, people are now able to take advantage of cellular technology, such that mobile units can now be carried along with the users, wherever they may go.

Cellular service providers generally maintain certain information regarding the mobile units to facilitate the proper routing of incoming phone calls to the desired recipients. Further information that needs to be transmitted to the mobile units may include the feature sets, which would dictate the features that are available on the subscribed mobile units. A home location register is able to determine which mobile switching center a subscribed mobile unit last registered with or visited, by referring to a last seen pointer. The home location register is then able to provide the feature set to the mobile unit, transfer incoming calls, for the mobile unit, and transfer outgoing calls from the mobile unit.

As mobile units are by definition mobile, it is very important for the cellular service providers to keep track of their locations. If a mobile unit cannot be located by the cellular service provider, i.e. it is not in the location indicated by the last seen pointer, then the mobile telephone will be non-functional as related to its intended purpose of receiving telephone calls, regardless of its location.

Within a large metropolitan area, several mobile companies will be competing for cellular customers. Consider an area where there are three such companies, A, B, and C. Each such provider will have its own mobile switching centers (MSCs). Further, each company maintains at least one home location register (HLR) for its cellular subscribers. When a call is placed, it may or may not be directed to a customer of the same service provider. The call may originate in many ways. For example, the call may come from outside the area from a distant company, or the caller may be using a non-cellular phone, or it may be from one customer of service provider A to another such customer of service provider A. Or, it may be from a customer of service provider A to a customer of service provider B. Whatever the circumstances, the service provider of the caller must attempt to complete the call to the called mobile unit, regardless of whether the service provider of that called party is service provider A, B, or C.

To facilitate the completion of calls to cellular customers, each provider maintains its own HLRs. When a call is made by a customer of A to a customer of A, then service provider A consults its own HLR to see where the called mobile unit was last located and attempts to complete the call there. But if the call is made by a customer of A to a customer of B, then provider A will request call delivery information from B, and B consults its own HLR to see where the called mobile unit is located and returns information to A regarding how to complete the call. Thus, multiple HLRs may be consulted, depending on the circumstances.

Sometimes the called party (the mobile unit) is not, in fact, located in the same region served by the pointer on the corresponding HLR. Alternatively, the mobile unit may be switched off and not able to receive an incoming call. Whatever the circumstance, the customer's service provider occasionally will not find the mobile unit at its last known location and will need to find the called unit by a process called flood paging.

Locating a missing mobile unit is therefore an extremely important task in the realm of cellular telecommunications. Sometimes messages will be lost within a telecommunications system and must be delivered to a missing mobile unit. Also, a situation might arise where a mobile unit is moving along a border representing the extreme points where service is provided by a MSC. Depending on where the mobile unit is located as related to the border, multiple MSCs might provide service to a mobile unit, where the mobile unit will be bouncing back and forth between those MSCs. One way of locating a missing mobile unit is through a method called flood paging. Flood paging involves sending location request signals to all of the MSCs under the control of a home location register. The MSC which has control of the mobile unit responds to the location request. When there is only one vendor in the market, such a proprietary method is acceptable.

As the mobile telephone industry is growing very quickly, new parties are entering the cellular telecommunications market. In the future, cellular service providers will invariably have equipment produced by more than one vendor in their telecommunications networks. There is therefore a need for a method in which flood paging can take place across a telecommunications network, regardless of the particular vendor whose equipment is being used.

The current standard for cellular radiotelecommunications intersystem operations provides for one-to-one transactions. For example, when a vendor receives a routing request, it must respond. Further, the standard does not discuss sending out more than one route request per transaction. The current interpretation of the standard does not explicitly state that transactions must be one-to-one. By implementing methods which permissibly deviate from the one-to-one transaction standard, the vendors will be able to allow functions which are currently not available across a multiple vendor system, such as flood paging.

SUMMARY OF THE INVENTION

In the preferred embodiment of the present invention, a method for flood paging in a mobile telecommunications system is disclosed, wherein the method comprises the steps of sending a request from a home location register to each of a plurality of mobile switching centers, wherein the request indicates an identifier for a called mobile unit, sending a plurality of pages from the plurality of mobile switching centers, wherein the plurality of pages includes the identifier for the called mobile unit, providing a page response from the called mobile unit to at least one of the plurality of mobile switching centers and providing an acknowledgment of location by at least one of the plurality of mobile switching centers to the home location register.

In another embodiment of the present invention, one or more of the plurality of mobile switching centers does not provide an acknowledgment of location to the home location register.

In an embodiment of the present invention, the home location register forwards a location request signal to a mobile switching center that is attempting to complete the incoming call to the called mobile unit. In a variation of this embodiment, the call is delivered to the first MSC responding with a tldn received by the home location register.

In another embodiment, the home location register maintains an index of the requests sent to each of the plurality of mobile switching centers.

In another embodiment, the home location register makes a determination as to which acknowledgment of location to act upon.

The embodiments further describe in a telecommunications system of the type having a plurality of mobile units, a plurality of mobile switching centers, a called mobile unit and a home location register, the improvement wherein the home location register provides a location request. wherein the plurality of mobile switching centers provide at least one paging signal to the called mobile unit, wherein at least one of the plurality of mobile switching centers is a serving mobile switching center, and wherein only the serving mobile switching center provides a message to the home location register in response to a response to the paging signal.

BRIEF DESCRIPTION OF THE DRAWINGS

The features of the present invention which are believed to be novel are set forth with particularity in the appended claims. The invention, together with the further objects and advantages thereof, may better be understood with reference to the following description taken in conjunction with the accompanying drawings, wherein like reference numerals identify like elements, and in which:

FIG. 5 is a flowchart of a second alternative method of flood paging according to the aspects of present invention.

DETAILED DESCRIPTION OF THE PREFERRED EMBODIMENTS

Figure 1:
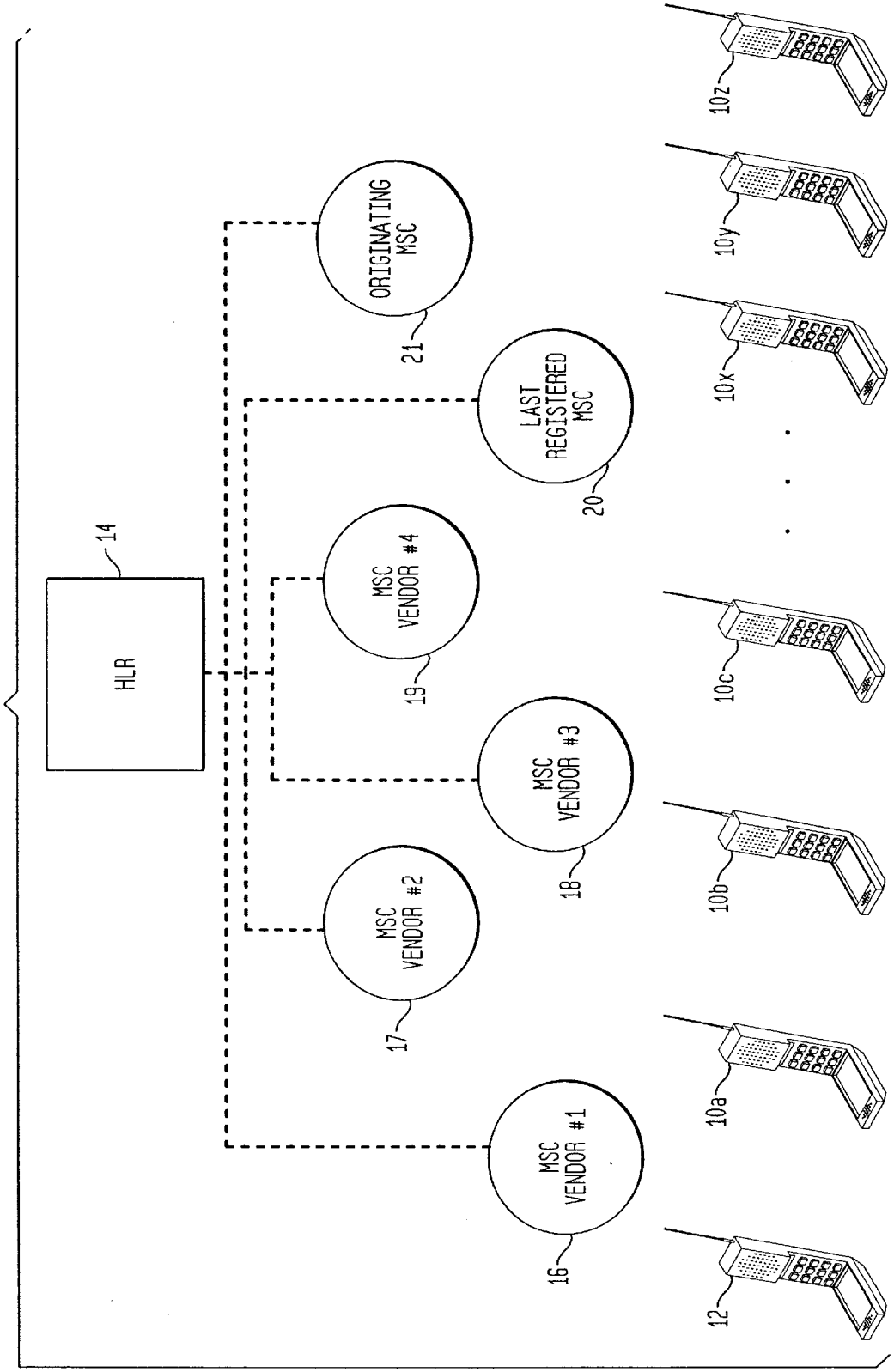
FIG. 1 shows a basic, multi-vendor telecommunications system.

FIG. 1 shows a plurality of mobile units 10a, 10b, . . . , 10y, 10z. Further, a called mobile unit 12, which represents the mobile unit which is to receive a particular incoming call, is shown Associated with the plurality of mobile units 10a, 10b, . . . , 10y, 10z, and called mobile unit 12 is a plurality of mobile switching centers (MSCs) 16, 17, 18, and 19. For example, in a major metropolitan area, competing service providers may include Ameritech, Primeco, Sprint PCS. etc. Each competitor maintains its own home location registers and mobile switching centers. Mobile switching centers define the services that are offered to mobile units in a telecommunications network. These services may include call waiting, call hold, caller identification, data services, and call forwarding. Also associated with the plurality of mobile units 10a–10z and called mobile unit 12 is visited MSC 20, which is the MSC with which called mobile unit 12 last registered or visited, and originating MSC 21, which is the MSC that is attempting to connect a call. Not all of the plurality of mobile units 10a–10z and called mobile unit 12 are in contact with each MSC. Finally, a home location register (HLR) 14 is shown. A home location register is a device which assists a cellular service provider in the routing of telephone calls in a mobile telecommunications system HLR 14 is associated with MSCs 16–21. A single HLR 14 is shown in FIG. 1, however it is possible for a cellular service provider to have more than one HLR in an area. In such a case where there are multiple HLRs for a particular cellular service provider, the HLRs do not interact with each other. Instead, the MSCs interact with the HLRs and with other MSCs. Within the United States. cellular service providers use their own home location registers, and not the home location registers of other cellular service providers. In some countries outside the United States, calls are delivered through the closest mobile switching center (MSC), regardless of ownership.

There are at least two ways in which a call for called mobile unit 12 will originate. First, a call can be land-based, meaning it does not originate from a mobile unit. Land-based calls are within what is referred to as a public switch telephone network. Within the public switch telephone network are associated mobile switching centers which are used in transmitting calls to mobile units. The associated mobile switching centers act as originating MSC 21 in the above description. Second, a call can be cellular-based, meaning it is call from a mobile unit to called mobile unit 12. Within the cellular-based calls, the calls can be inter-provider or intra-provider. For intra-provider calls, the originating MSC 21 contacts HLR 14, which then attempts to connect the call to called mobile unit 12. For inter-provider calls, the originating MSC 21 within a first cellular service provider's network will contact a second MSC which is from the called unit's cellular service provider's network. The second MSC will contact the HLR for the called unit's cellular service provider and obtain information about the called mobile unit, so as to allow the call to be completed.

Figure 2:
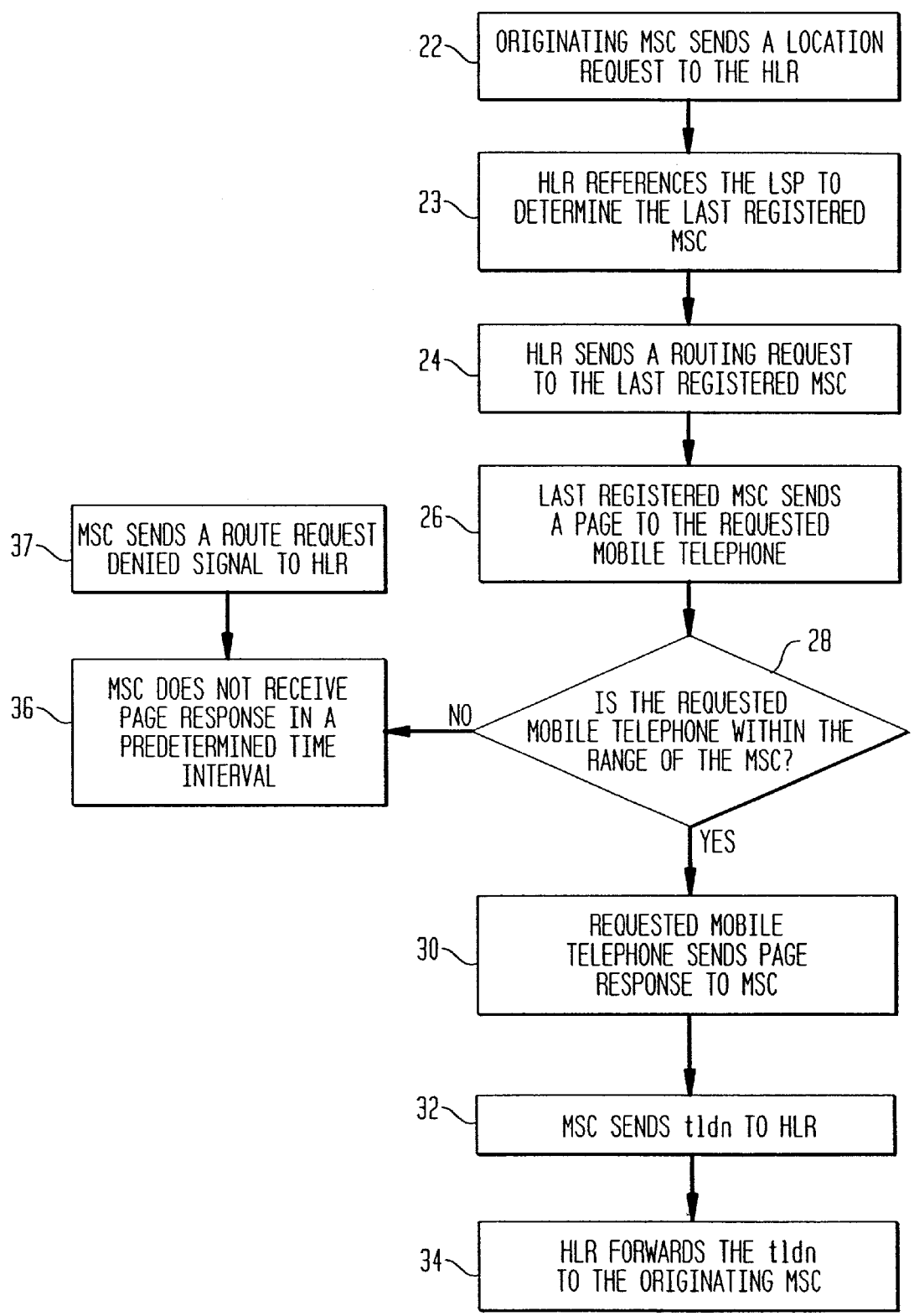
FIG. 2 is a flowchart of the steps used in attempting to connect a mobile to an incoming call.

FIG. 2 shows a flowchart of the steps used in attempting to connect a mobile to an incoming call. One of the functions of home location register 14 is maintaining a pointer indicating where a mobile telephone was last seen. Such a pointer provides HLR 14 with an initial starting point when a call is to be received by called mobile unit 12. When HLR 14 receives a location request from originating MSC 21 indicating that there is a telephone call for called mobile unit 12, the location of called mobile unit 12 must be determined. Such a location request is generally done in a cellular manner. Block 22 represents originating MSC 21 sending a location request to HLR 14.

HLR 14 references the last seen pointer to determine the last known location of called mobile unit 12. More specifically, the last seen pointer indicates which MSC in the cellular service network was last used by the called mobile unit 12. For discussion, this may be MSC 20, which can be referred to as the "last registered MSC" 20. It is called last registered MSC 20 because it is the last MSC with which the called mobile unit 12 registered. This is represented by block 23.

As shown in block 24, HLR 14, in response to the location request (see block 22), transmits a routing request to the MSC indicated by the last seen pointer, last registered MSC 20. The routing request contains a transaction identifier which allows HLR 14 to keep track of outstanding transactions, such as routing requests. Then, as shown in block 26, last registered MSC 20 receives the routing request from HLR 14 (see block 24) and then sends out a paging request to the called mobile unit 12, which is identified based upon a unique mobile identifier number.

As represented by block 28, the determination of whether called mobile unit 12 is within the range of the last registered MSC 20 must be made. Either the called mobile unit 12 will receive the paging request from last registered MSC 20, or it will not receive the paging request. In the case where called mobile unit 12 successfully receives the paging request (see block 30), the called mobile unit 12 will send a page response to the last registered MSC 20, which, in this case is also the serving MSC. The serving/last registered MSC 20 will provide HLR 14 with a temporary local directory number (tldn) (see block 32) which is then used to allow the called mobile unit 12 to receive the incoming call. This is effectuated by having HLR 14 forward the temporary local directory number (tldn) to originating MSC 21.

Upon receipt of the temporary local directory number of the called mobile telephone 12, originating MSC 21 processes the incoming call in the following manner. By performing digit analysis, originating MSC 21 is able to determine how to route the call to called mobile unit 12. More specifically, originating MSC 21 determines which trunk group is best to transfer the call towards the serving MSC. The serving MSC, through the use of the mobile identifier number is able to complete the call to called mobile unit 12. Upon receipt of the call, called mobile unit 12 may provide an indication that there is an incoming call.

In the case where the last registered MSC 20 does not receive a page response from called mobile unit 12 during a predetermined time interval (see block 36), last registered MSC 20 will provide HLR 14 with a route request denied signal, as a result of no response to the paging request (see block 37).

When faced with a situation where the last registered MSC 20 cannot serve called mobile unit 12, action must be taken to locate the missing mobile. Flood paging, which refers to paging numerous MSCs in search of the called mobile unit 12, is then necessary.

Preferred (First) Embodiment

Figure 3:
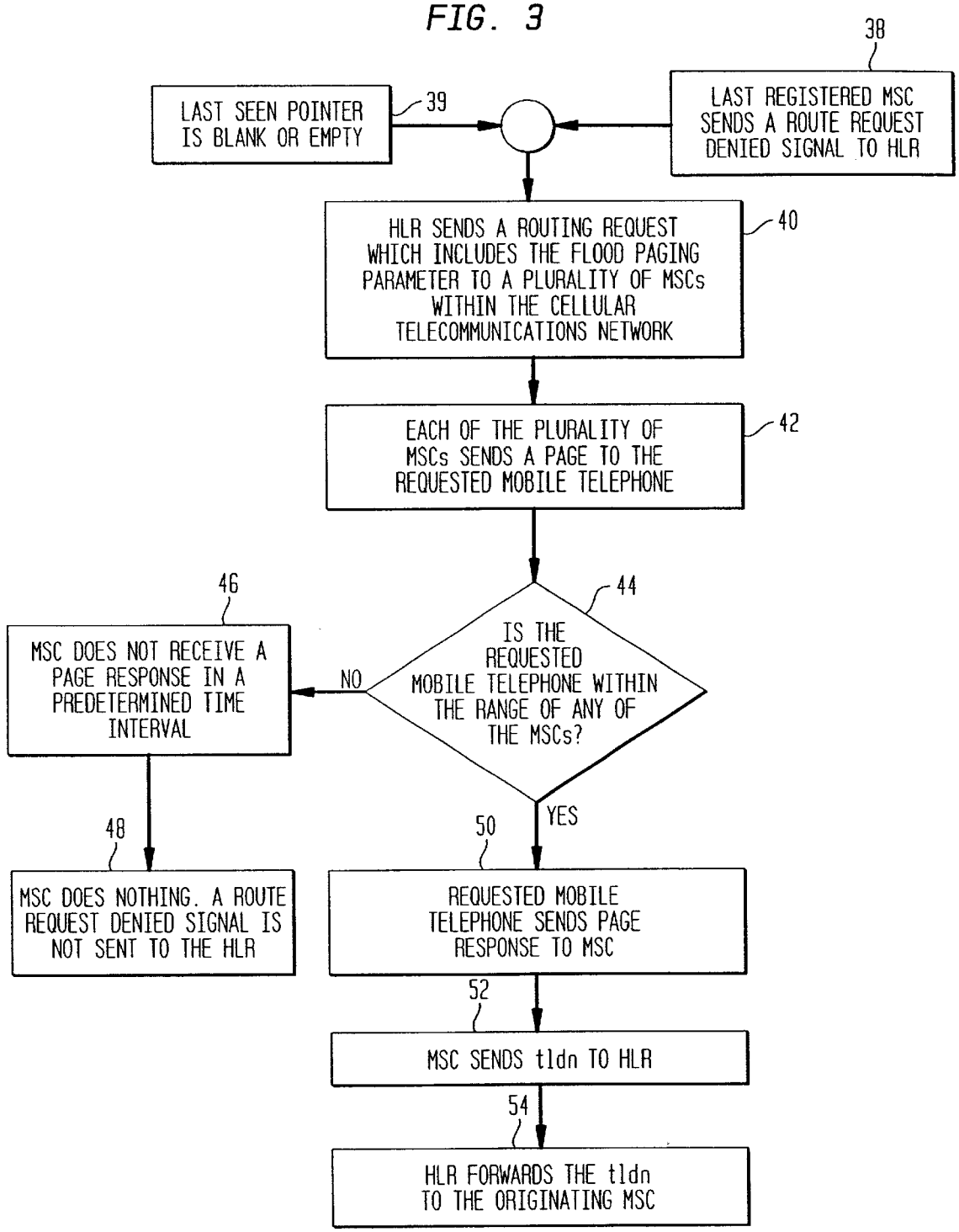
FIG. 3 is a flowchart of the preferred method of flood paging according to aspects of the present invention.

The preferred embodiment of the method of the present invention for flood paging in a telecommunications system is illustrated in FIG. 3. Upon receiving a route request denied signal from last registered MSC 20(see block 38). HLR 14 must then attempt to locate the called mobile unit 12 within the cellular telecommunications system. Earlier, HLR 14 had sent a routing request to last registered MSC 20 with which called mobile unit 12 had last registered. In the preferred embodiment, flood paging would take place in the following manner. HLR 14 will send a routing request including the same transaction identifier to the plurality of MSCs 16, 17, 18, 19, 20 and 21 within the cellular telecommunications network (see block 40). This allows HLR 14 to send out multiple routing requests, but expect a single response, as HLR 14 would have a single outstanding request related to the above. An identifier indicating that the system is in flood paging mode would also be included within the routing request. Each of the plurality of MSCs 16, 17, 18, 19, 20 and 21, will then send a page to called mobile unit 12 (see block 42). As described with reference to FIG. 1, it must be determined whether called mobile unit 12 is within the range of a particular $MSC_x$ (see block 44), where $MSC_x$ is one of the plurality of MSCs 16, 17, 18, 19, 20 and 21. If called mobile unit 12 is within the range of a particular $MSC_x$, it will respond with a page response to that MSC (see block 50). $MSC_x$ is therefore the serving MSC. If called mobile unit 12 is not within the range of a particular $MSC_x$, the paging request will time out after $MSC_x$ does not receive a response within a predetermined time interval (see block 46). Unlike the prior art, $MSC_x$ does not send a route request denied signal to HLR 14 when the paging request times out. This is because one of the other MSCs within the plurality of MSCs 16, 17, 18. 19, 20 and 21, will be the serving MSC. The serving MSC will receive a page response from the called mobile unit 12 and will provide HLR 14 with a temporary local directory number.

Another instance in which flood paging is useful is when the last seen pointer within HLR 14 for called mobile unit 12 is blank or empty (see block 39). If called mobile unit 12 has not registered, the last seen pointer will not provide any information which can be used to locate the mobile. Flood paging allows HLR 14 a way of locating a mobile that has not registered.

In essence, the preferred embodiment allows HLR 14 to locate a missing called mobile unit 12 in a telecommunications system which contains equipment of more than one vendor. In the prior art, the MSCs would necessarily provide responses to the home location register for each location request. This would imply that the HLR would receive numerous responses in a flood paging situation., with the HLR subsequently transferring numerous signals to the originating MSC indicating that the location of called mobile unit 12 is not under the control of some MSCs, along with a signal indicating that called mobile unit 12 is under the control of a serving MSC. By adjusting the manner in which the MSCs operate, flood paging as described in this preferred embodiment may take place in a telecommunications system containing MSCs made by different manufacturers without having to replace HLR 14. This is true because the HLR would only receive an indication that the location of called mobile unit 12 was identified and is under the control of the serving MSC, and would not receive additional responses from MSCs which do not have control of called mobile unit 12.

Second Embodiment

Figure 4:
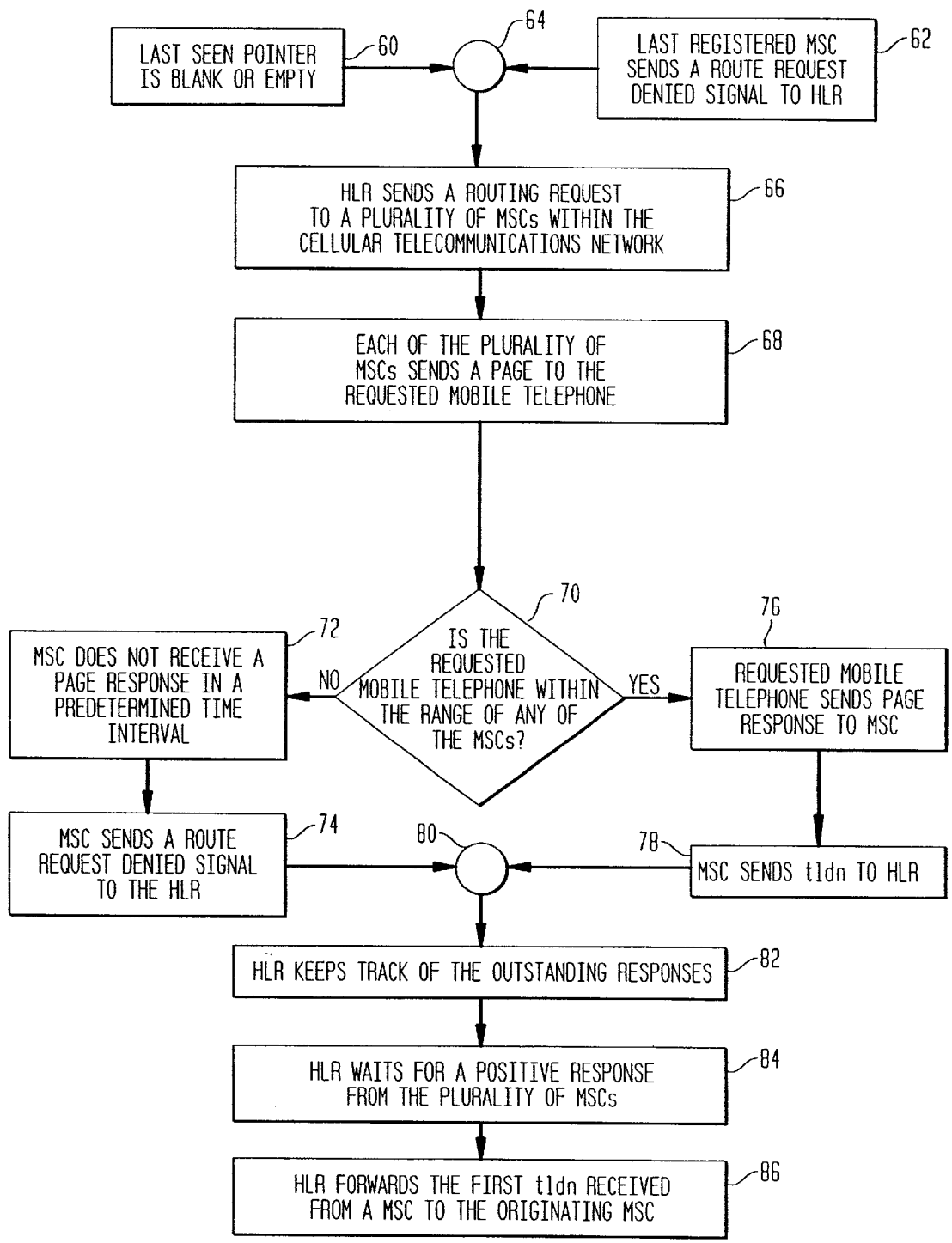
FIG. 4 is a flowchart of a first alternative method of flood paging according to aspects of the present invention.

An alternative method of flood paging is shown in FIG. 4. This is a case where, unlike in the preferred method described with reference to FIG. 3, the manner in which HLR 14 operates is adjusted, as opposed to adjusting the manner in which the MSCs operate. As in the preferred method, it is assumed that flood paging is necessary because either the last registered MSC 20 sends a route request denied signal or the last seen pointer within HLR 14 for called mobile unit 12 is blank or empty (see blocks 60 and 62). Upon the recognition that either the last seen pointer is blank or the receipt of a route request denied signal from last registered MSC 20 (see block 64), HLR 14 must then attempt to locate the called mobile unit 12 within the cellular telecommunications system.

Earlier, HLR 14 had sent a routing request to the last registered MSC 20 with which called mobile unit 12 had last registered. In this second embodiment, flood paging would take place in the following manner. HLR 14 will send a routing request including the same transaction identifier to all of the MSCs ($MSC_0$ $MSC_1$, ..., $MSC_V$, ..., $MSC_S$ ..., $MSC_x$) within the cellular telecommunications network (see block 66). MSCV represents the last registered MSC 20. $MSC_S$ represents the serving MSC, and MSC, represents a MSC within the network which is being discussed. An identifier indicating that the system is in flood paging mode would be included within the routing request. Each MSC will then send a page to called mobile unit 12 (see block 68). As described with reference to FIG. 1, it must be determined whether called mobile unit 12 is within the range of a particular $MSC_x$ (see block 70). If called mobile unit 12 is within the range of a particular MSC$_x$, it will respond with a page response to MSC$_x$ (see block 76). MSC$_x$ is therefore the serving MSC. If called mobile unit 12 is not within the range of a particular MSC$_x$, the paging request will time out after MSC$_x$ does not receive a response within a predetermined time interval (see block 72). The timed out MSC$_x$ will then send a route request denied signal to the HLR 14 (see block 74).

The second embodiment has placed the adjustments in HLR 14, in that HLR 14 is able to keep track of the outstanding routing requests (see block 82). By determining which MSCs have responded with route request denied signals, and which MSC has responded with a temporary local directory number, HLR 14 is able to determine which MSCs is serving the called mobile unit 12 as that MSC provided the temporary local directory number (see block 84). HLR 14 then forwards the temporary local directory number to the originating MSC 21, so that the call can be completed (see block 86).

It is possible that more than one MSC will receive a page response from the called mobile unit 12. Because the adjustments are within HLR 14, HLR 14 is able to respond to the first successfully received temporary local directory number and to disregard subsequently received temporary local directory numbers. Those subsequent signals are not acted upon, as a serving MSC$_S$ has been located which can contact the called mobile unit 12.

Third Embodiment

A third embodiment is represented by FIG. 5. As in the preferred (first) embodiment it is assumed that flood paging is necessary because either the visited MSC sends a route request denied signal or the last seen pointer is blank or empty (see blocks 90 and 92). Upon the recognition that either the last seen pointer is blank or the receipt of a route request denied signal from last registered MSC 20 (see block 94), HLR 14 must then attempt to locate the called mobile unit 12 within the cellular telecommunications system. In this embodiment, flood paging would take place in the following manner. HLR 14 will send a routing request including the same transaction identifier to a plurality of MSCs within the cellular telecommunications network (see block 96). An identifier indicating that the system is in flood paging mode would be included within the routing request. Each MSC will then send a page to called mobile unit 12 (see block 98). As described with reference to FIG. 1, it must be determined whether called mobile unit 12 is within the range of a particular MSC$_x$ (see block 100). If called mobile unit 12 is within the range of a particular MSC$_x$ it will respond with a page response to MSC$_x$ (see block 106). MSC$_x$ is the serving MSC. The serving MSC will then send a temporary local directory number to HLR 14 (see block 108). If called mobile unit 12 is not within the range of a particular MSC$_x$, the paging request will time out after MSC$_x$ does not receive a response within a predetermined time interval (see block 102). The timed out MSC$_x$ will then send a route request denied signal to HLR 14 (see block 104).

As in the second embodiment, the adjustments have been placed in HLR 14, in that HLR 14 is able to keep track of the outstanding routing requests (see block 112). HLR 14 waits for all outstanding response before taking action. HLR 14, upon receiving all of the responses from the MSCs, determines which response from the plurality of MSCs it should act upon (see block 114). The temporary local directory number is then forwarded from HLR 14 to the originating MSC 21 (see block 116).

It is possible that more than one MSC will receive a page response from the called mobile unit 12. If more than one MSC receives a page response from the called mobile unit 12, the HLR 14 will resultantly receive more than one temporary local directory number. Because the adjustments have been placed in HLR 14, HLR 14 is able to make determinations based upon, for example, signal quality. This determination may be based upon the possible degradation of the page response signal due to distance from the MSC$_S$. Upon determining which temporary local directory number is best to act upon, or on selecting a temporary local directory number, HLR 14 then transmits that information to the originating MSC. 21. In this way, overlapping MSCs will not cause a problem in a flood paging situation.

Although the present invention has been described with reference to preferred embodiments, workers skilled in the art will recognize that changes may be made in form and detail without departing from the spirit and scope of the invention.

What is claimed is:

1. A method for flood paging to signal a selected mobile unit that is operating in a mobile telecommunications system which includes at least two mobile switching centers, comprising the steps of:

sending a single request from a home location register that serves said selected mobile unit to each of a plurality of mobile switching centers, wherein said request includes a transaction identifier, an indication that said request is a flood paging request and an identifier for said selected mobile unit;

maintaining in said home location resister an index of the requests sent to each of said plurality of mobile switching centers;

broadcasting, in response to receipt of said single request, at least one page from each of said plurality of mobile switching centers to said selected mobile unit, wherein each of said pages includes the identifier for said selected mobile unit;

receiving a page response from said selected mobile unit in at least one of said plurality of mobile switching centers; and providing a location acknowledgment to said home location register that serves said selected mobile unit identifying said at least one of said plurality of mobile switching centers which received said page response from said selected mobile unit.

2. The method of claim 1 further comprising: failing to provide a location acknowledgment to said home location register that serves said selected mobile unit by at least one of said plurality of mobile switching centers which received said page response from said selected mobile unit.

3. The method of claim 1 further comprising:

forwarding a mobile unit present location signal from said home location register to a mobile switching center that is attempting to transmit a signal to said selected mobile unit.

4. The method of claim 3 wherein said mobile unit present location signal is a first location acknowledgement received by said home location register in response to sending said single request.

5. The method of claim 1 further comprising:

making a determination in said home location register as to which of a plurality of received location acknowledgments to act upon.

6. In a mobile telecommunications system that includes a plurality of mobile switching centers each of which serve a plurality of mobile units, a system for flood paging a selected mobile unit comprising:

a home location register that serves said selected mobile unit for providing a single location request signal that includes a transaction identifier, an indication that said request is a flood paging request and an identifier for said selected mobile unit to said plurality of mobile switching centers;

means for maintaining in said home location register an index of the requests sent to each of said plurality of mobile switching centers;

paging means, located in each of said plurality of mobile switching centers for transmitting at least one paging signal to said selected mobile unit in response to receipt of said single request; and wherein at least one of said plurality of mobile switching centers is a serving mobile switching center, and only said serving mobile switching center provides a signal to said home location register in response to a positive response to said paging signal received from said selected mobile unit.

7. The system for flood paging a selected of claim 6 further comprising:

means for failing to provide a location acknowledgment to said home location register that serves said selected mobile unit by at least one of said mobile switching centers which received said page response from selected mobile unit.

8. The system for flood paging a selected of claim 6 further comprising:

means for forwarding a mobile unit present location signal from said home location register to a mobile switching center that is attempting to transmit a signal to said selected mobile unit.

9. The system for flood paging a selected mobile unit of claim 8 wherein said mobile unit present location signal is a first acknowledgement received by said home location register in response to sending said single request.

10. The system for flood paging a selected of claim 6 further comprising:

means for making a determination in said home location register as to plurality of received location acknowledgments to act upon.

* * * * *